United States Patent [19]

Sinclair et al.

[11] Patent Number: 4,655,672

[45] Date of Patent: Apr. 7, 1987

[54] NO CREASE OPTION FOR A LIFT TRUCK ATTACHMENT

[75] Inventors: Stuart W. Sinclair, Lake Jackson; Kenneth R. Lane, Houston, both of Tex.

[73] Assignee: Long Reach Manufacturing Co., Houston, Tex.

[21] Appl. No.: 827,692

[22] Filed: Feb. 10, 1986

[51] Int. Cl.[4] ................................................ B60P 1/02

[52] U.S. Cl. .................................... 414/661; 414/607; 414/785; 414/497; 414/280

[58] Field of Search ............... 414/661, 662, 663, 785, 414/751, 753, 607, 667, 671, 659, 786, 912, 497, 917, 608, 280, 281, 214, 19, 20

[56] References Cited

U.S. PATENT DOCUMENTS

| | | | |
|---|---|---|---|
| 2,590,355 | 3/1952 | Turner et al. | 414/661 |
| 2,601,932 | 7/1952 | Turner | 414/661 |
| 2,619,241 | 11/1952 | Jessen | 414/661 |
| 2,672,249 | 3/1954 | Ulinski | 414/661 |
| 2,996,204 | 8/1961 | Jensen | 414/661 |
| 4,482,286 | 11/1984 | Farmer | 414/661 X |

FOREIGN PATENT DOCUMENTS

| | | | |
|---|---|---|---|
| 1556039 | 9/1969 | Fed. Rep. of Germany | 414/497 |
| 1556041 | 1/1970 | Fed. Rep. of Germany | 414/661 |
| 1556038 | 3/1970 | Fed. Rep. of Germany | 414/661 |
| 35065 | 3/1977 | Japan | 414/497 |

*Primary Examiner*—Frank E. Werner
*Attorney, Agent, or Firm*—Fulbright & Jaworski

[57] ABSTRACT

A no crease system for a push/pull attachment on a lift truck for avoiding damaging loads. A gripper having a bar and a shoe for gripping and releasing a slip sheet carrying a load is provided with a control circuit for closing the gripper to the gripping position when the push plate is extended for protecting the load from damage by an open gripper. The circuit includes a valve connected to the push/pull attachment and actuated by the push/pull attachment when the push plate is fully extended. The valve may be deactuated by a control switch.

4 Claims, 24 Drawing Figures

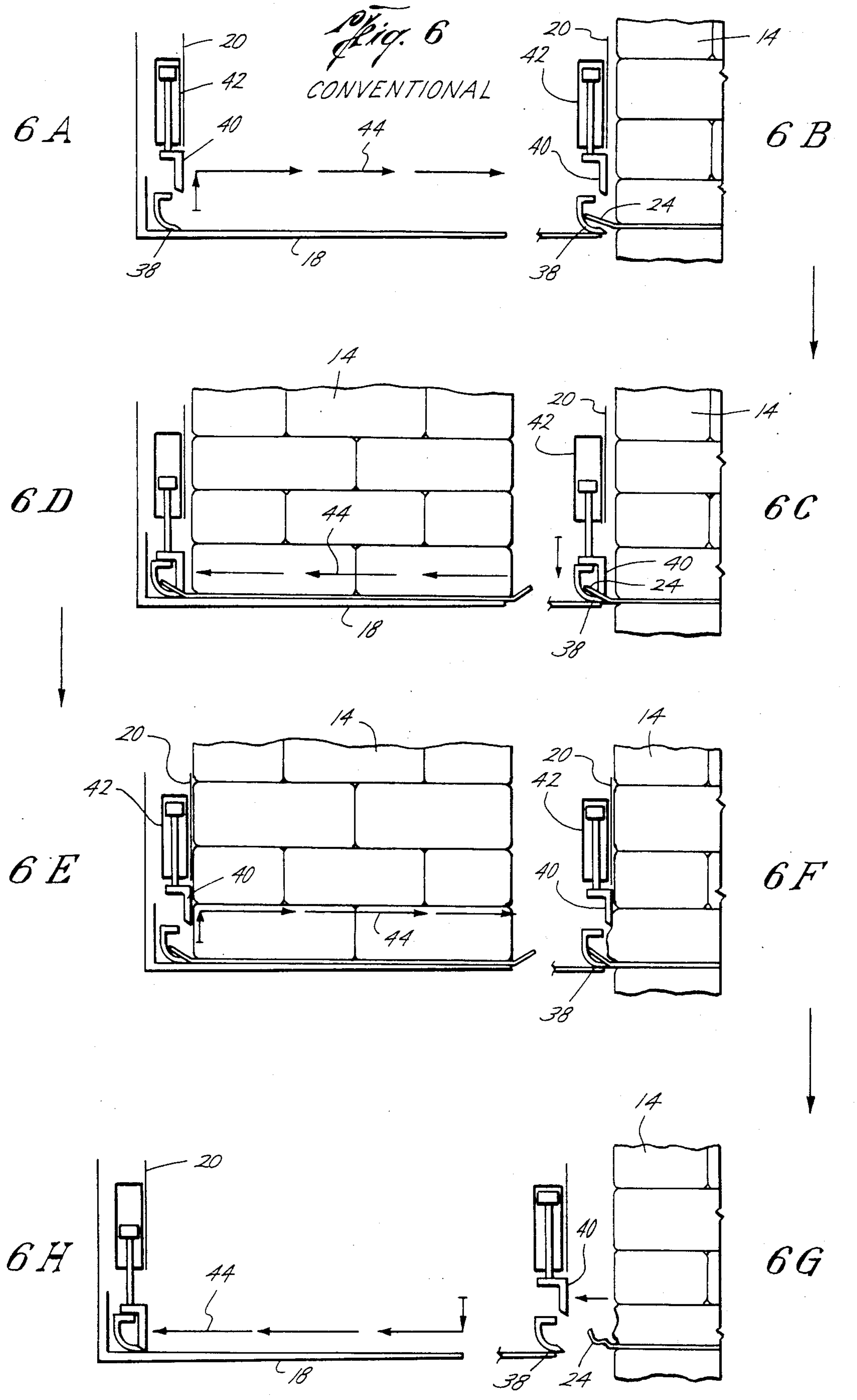
Fig. 6
CONVENTIONAL
6A
6B
6C
6D
6E
6F
6G
6H
14
18
20
24
38
40
42
44

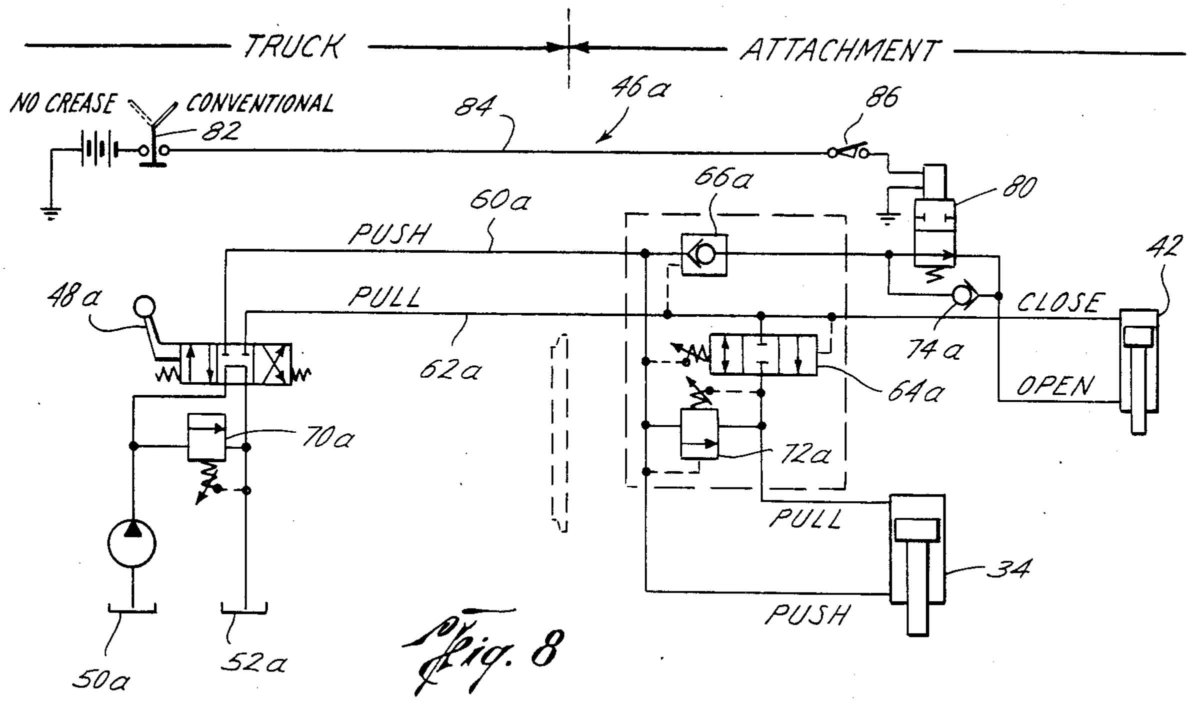
Fig. 8
Fig. 9
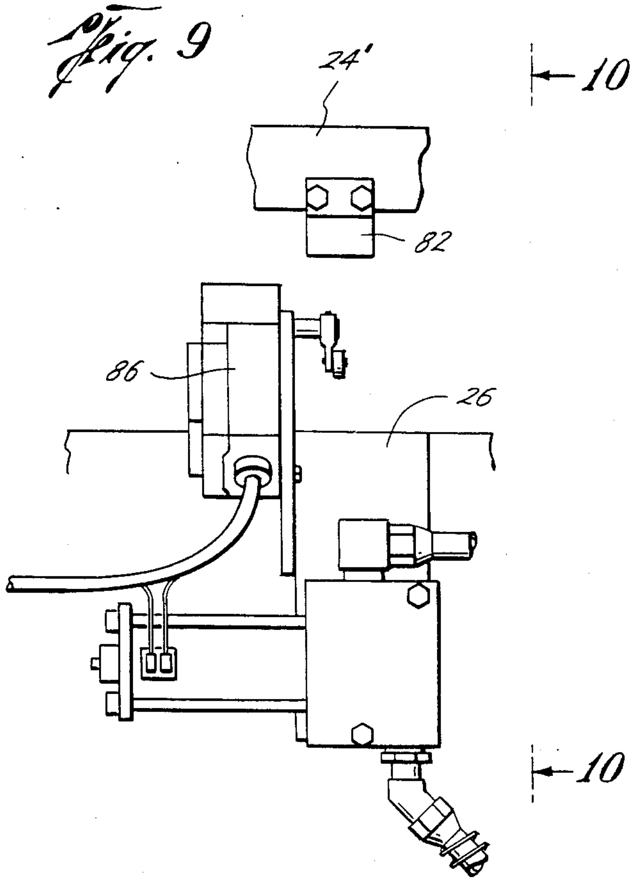
Fig. 10
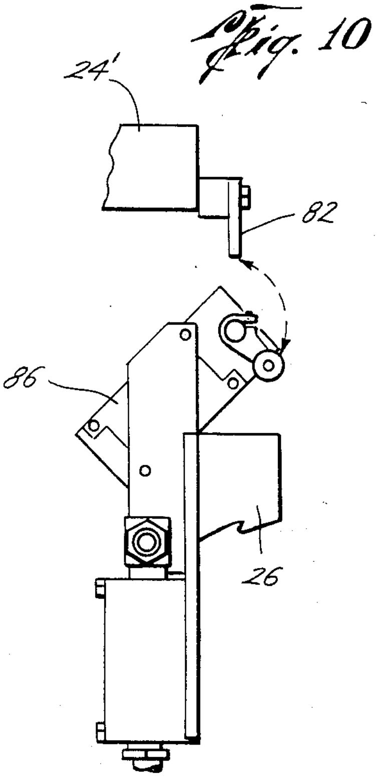

NO CREASE OPTION FOR A LIFT TRUCK ATTACHMENT

BACKGROUND OF THE INVENTION

It is known to utilize a lift truck with a push/pull attachment for transporting loads from one location to a second location. Push/pull attachments are used having a gripper consisting of a gripper bar which coacts with a gripper shoe to grip a slip sheet upon which a load is resting to pull the slip sheet and thus the load on to the lift truck platen for transporting the load. When the second location is reached the load is pushed off of the platen at the second location. However, in the past, the gripper mechanism, which is attached to the push plate, has caused damage to lower tiers of a load, particularly delicate loads, or at least has created an unsightly crease on the load which may detract from its value.

The present invention is directed to a no crease option which may be used to allow the extension of the push plate of the push/pull attachment with the gripper bar in a down position against the gripper shoe for further protecting the load from creasing and other damage as the push plate engages a load.

SUMMARY OF THE INVENTION

The present invention is directed to a no crease option on a push/pull attachment for a lift truck in which a gripper bar remains in a downward position against the gripper shoe during the push stroke of the push/pull attachment and opens only at the end of the stroke for reducing the wedging of a load into the gripper shoe area and reduces creasing of the load.

A still further object of the present invention is the provision of a no crease option on a push/pull attachment which includes a push plate, a push/pull attachment including a push plate and including a push/pull double acting piston and cylinder assembly for extending and retracting the plate. A gripper is connected to the push plate and includes a close/open double acting gripper piston and cylinder assembly for closing and gripping or opening and releasing a slip sheet. A control circuit is provided for closing the gripper to the gripping position when the push plate is extended for protecting a load from damage.

The control circuit includes a first hydraulic push line and a second hydraulic pull line connected to the push-/pull assembly for alternately acting on the assembly for extending or retracting the push plate. An operating valve is connected to the first and second lines for supplying hydraulic fluid from a hydraulic source. The first and second lines are connected to the gripper assembly for opening and closing the gripper, respectively. A pilot actuated two position hydraulic normally closed valve is connected in the second line upstream of the gripper assembly. The valve is connected to the push-/pull attachment and actuated by the push/pull attachment when the push plate is extended thereby opening the two position valve for opening the gripper. A check valve is provided in parallel with the two position valve allowing fluid flow from the gripper assembly, but preventing fluid flow to the gripper assembly.

Yet a further object of the present invention is wherein the push/pull attachment includes first and second pivotally connected members and the pilot valve is positioned on one of the members and an actuating cam is positioned on the other member.

Yet a still further object of the present invention is wherein the pilot valve is solenoid operated.

Still a further object of the present invention is the provision of a hand controlled electrical switch connected to the solenoid for deactuating the operation of the solenoid valve.

Other and further objects, features and advantages will be apparent from the following description of presently preferred embodiments of the invention, given for the purpose of disclosure, and taken in conjunction with the accompanying drawings, where like character references designate like parts throughout the several views.

BRIEF DESCRIPTION OF THE DRAWINGS

FIG. 8 is a schematic electrical and hydraulic diagram of another embodiment of the present invention, FIG. 9 is an enlarged fragmentary elevational view of the placement of the electrically operated valve of FIG. 8 on the push/pull attachment, and FIG. 10 is a cross-sectional view taken along the line 10—10 of FIG. 9.

DESCRIPTION OF THE PREFERRED EMBODIMENTS

Figure 1:
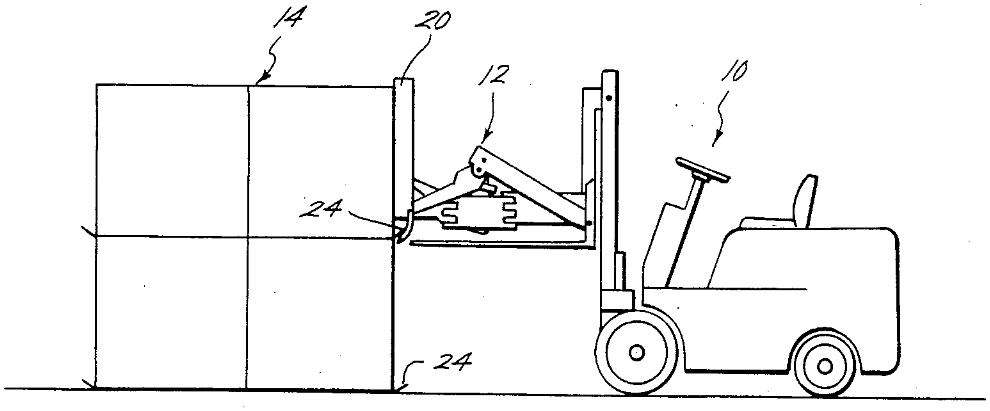
FIG. 1 is an elevational view of a lift truck with a push/pull attachment for picking up, transporting, and depositing a load.
Figure 2:
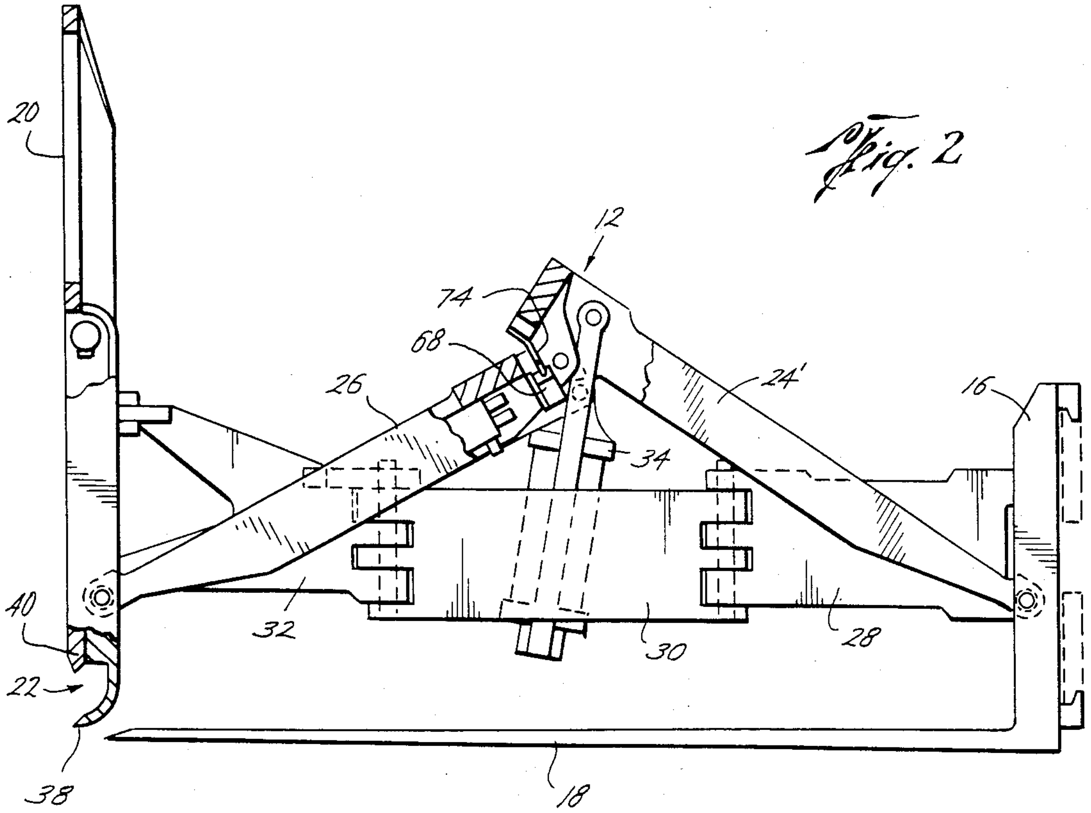
FIG. 2 is an enlarged elevational view of the push-/pull attachment shown in the extended position.

Referring now to the drawings, in particular to FIGS. 1 and 2, the reference numeral 10 generally indicates a fork lift truck and a push/pull attachment, generally indicated by the reference numeral 12, for picking-up a load, generally indicated by the reference numeral 14, and transporting and depositing the load 14 at another location.

The push/pull attachment 12 may consist of any suitable mechanism, such as a frame 16 for attachment to the lift truck 10, a platen 18 for receiving and carrying a load, a push plate 20 having a gripper assembly, generally indicated by the reference numeral 22, for gripping a slip sheet 24 on which a load 14 rests for pulling the load onto the platen 18. After the load 14 has been transported the attachment pushes the load off of the platen 18. For horizontally moving the push plate 20, a rear yoke 24' is pivotally connected to the frame 16, and is pivotally connected to a front yoke 26 which is pivotally connected to the push plate 20. Supports 28, 30 and 32 are provided to support the movement of the push plate 20 horizontally, outwardly and inwardly. A push-/pull double acting piston and cylinder assembly 34 is provided connected between the yokes 24' and 26 for extending and retracting the push plate 20. For a fuller description of a mechanism for retracting a push plate, U.S. Pat. No. 3,182,836 and patent application Ser. No. 602,026, filed Apr. 19, 1986,now abandoned, is incorporated herein by reference.

The gripper assembly 22, as best seen in FIG. 2, includes a gripper shoe 38 and a vertically movable gripper bar 40, which moves downwardly towards the shoe 38 for gripping a slip sheet 24 and upwardly for releasing a slip sheet, and is operated by a close/open double acting gripper piston and cylinder assembly which will be more fully described hereinafter. The gripper assembly 22 allows the use of the lift truck 10 for palletless handling of loads thereby reducing material handling costs by reducing the need for expensive pallets.

However, the gripper assembly 22 provides a noncontinuous interface with the front of the push plate 20 and provides sharp edges for engaging a slip sheet 24. In operation, the sharp edges of the gripper assembly 22 may damage the load 14, particularly in transporting delicate materials. Furthermore, even when the materials are in protective containers the gripper assembly 22 may create a crease on the lower tier containers which is not only unsightly, but reduces the commercial value of the goods.

Referring now to FIGS. 6A through 6H, the operation of a conventional gripper assembly is best seen. In FIG. 6A, the gripper bar 40 is raised and follows the path of the arrows 44 as hydraulic fluid is applied to a close/open piston and cylinder assembly 42, and the push plate 20 is moved outwardly as hydraulic fluid is applied to the push/pull piston and cylinder assembly 34. As best seen in FIG. 6B, the push plate 20 and gripper assembly is moved adjacent the load 14 so as to move the gripper about the extending edge of the slip sheet 24. Normally, the load 14 is not damaged by the sharp edges of the gripper shoe 38 and gripper bar 40 during this operation if the operator of the lift truck is careful. However, since the gripper shoe 40 is in the open position, damage can occur if the push plate 20 and gripper assembly is forcibly moved into a load 14. A hydraulic pull force is applied to the piston and cylinder assemblies 42 and 34 causing first the gripper bar 40 to move downwardly, as best seen in FIG. 6C, gripping the slip sheet 24 between the gripper bar 40 and the gripper shoe 38, and thereafter the push plate 20 is retracted pulling the slip sheet 20 and the load 14 onto the platen 18, as best seen in FIG. 6D.

After the load 14 has been transported to the desired location by the lift truck 10, a hydraulic push force is applied to the piston and cylinder assemblies 34 and 42, which as best seen in FIGS. 6E and 6F, first raises the gripper bar 40 and then extends the push plate 20 to push the load 14 off of the platen 18. It is during this operation that damage occurs to the lower tiers of the load 14. That is, the pushing force against the load 14 is greatest on the lower portions of the load 14, and the sharp edges of the bar 40 and shoe 38 allows wedging of small products or cases into the gripper and causes creasing of product containers on the lower tier. After the load is deposited at a second location the gripper bar 40 is disengaged from the slip sheet 24, the lift truck then is backed away (FIG. 6G), and if the push plate 20 is retracted the gripper closes first and remains closed through the retraction (FIG. 6H), and then is available for another cycle of operation.

However, as indicated in the conventional operation of a push/pull attachment with a gripper for handling loads with a slip sheet, and particularly where delicate loads are being handled, damage or unsightly creases may be incurred by the lower levels of the load 14.

The present invention is directed to providing a no crease option in which the gripper bar remains down against the gripper shoe during the push stroke of the push plate, and opens only at the end of the stroke thereby protecting the load against wedging in the gripper, or being damaged by the sharp edges of the gripper assembly. Referring now to FIGS. 7A through 7H, the operation of the no crease option of the present invention is best seen, in which, when the piston and cylinder assembly 34 is actuated to extend the push plate 20, the gripper bar 40 remains in the down position to follow the arrows 44a as best seen in FIG. 7A. Only when the end of the stroke is reached, as best seen in FIG. 7B does the gripper bar 40 raise. Thereafter, the gripper assembly engages the slip sheet 24, all of which encourages the operator to exercise care. As best seen in FIG. 7C, the gripping assembly is closed by hydraulic power to piston and cylinder assembly 42 and thereafter power is applied to piston and cylinder assembly 34 to retract the push plate 20, and pull the slip sheet 24 and load 14 onto the platen 18, as best seen in FIG. 7D. After the lift truck 10 has transported the load to the desired location, a hydraulic force is applied to the piston and cylinder assembly 34 to move and extend the push plate 20 outwardly. However, during this time period the gripper bar 40 remains in the downward position, as best seen in FIG. 7E, to protect the lower tiers of the load 14 from damage. Only after the end of the stroke, as best seen in FIG. 7F, is the piston and cylinder assembly 42 actuated to raise the gripper bar 40 and release the slip sheet 24. Therefore, during the pushing cycle there is a reduced stress on the load 14, and the closed bar 40 eliminates wedging of small products or cases into the space between the gripper shoe 38 and the gripper bar 40. As best seen in FIG. 7G, the lift truck 10 is then backed away from the load 14 with the gripper open, and retraction of the push plate 20 causes the gripper bar 40 to close and remain closed during a retraction cycle. The lift truck 10 is now ready to engage and pick-up another load and repeat the cycle.

Figure 3:
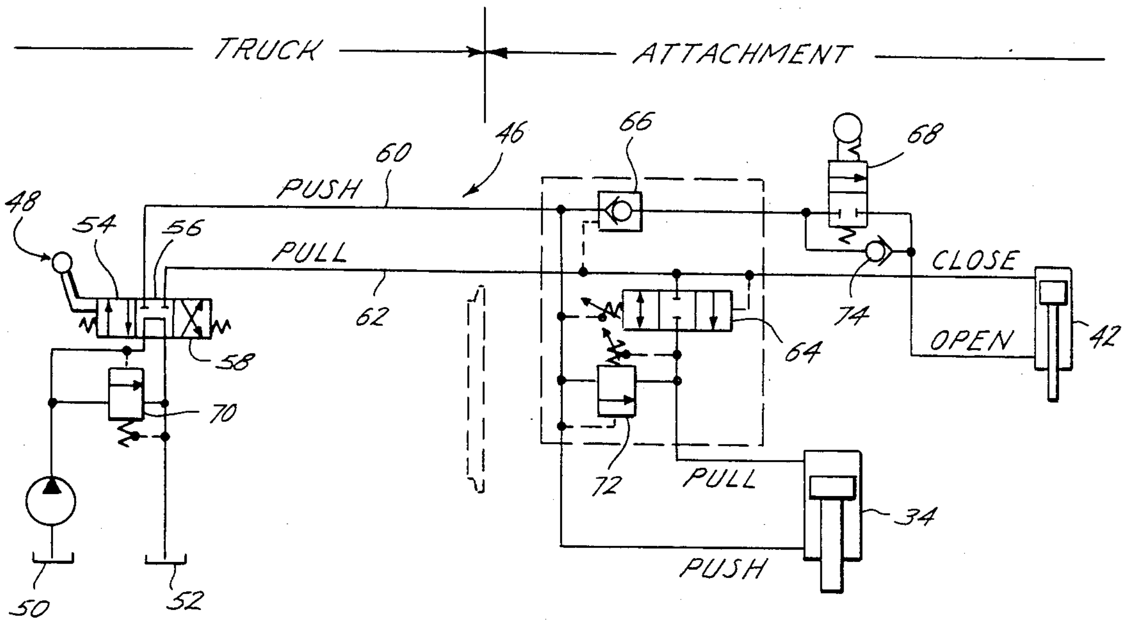
FIG. 3 is a hydraulic schematic showing the operation of the push/pull attachment and the operation of the no crease option of the present invention.

Referring now to FIG. 3, a schematic of a control circuit, generally indicated by the reference numeral 46, is best seen for closing the gripper to the gripping position when the push plate is extended for protecting a load from damage, and for operating in the no crease option sequence described in FIGS. 7A through 7H. An operating valve, generally indicated by reference numeral 48, is provided on the lift truck for supplying hydraulic control fluid from a source 50 through the circuit 46 and back to a return 52. The operating valve 48 includes a push position 54, a blocked position 56 and a pull position 58.

A first hydraulic push line 60, and a second hydraulic pull line 62, are provided connected between the operating valve 48 and the push/pull cylinder assembly 34, which extends and retracts the push plate 20. In addition, the push line 60 is in communication with the open side of the close/open double acting gripper piston and cylinder assembly 42, while the pull line 62 is in communication with the close side of assembly 42.

A sequence valve 64 is provided in the second line 62 to the assembly 34, which normally blocks fluid therethrough, but opens in response to a predetermined build-up of pressure in the line 62, caused by closing of the gripper 22 and further stoppage of hydraulic fluid to the assembly 42. A pilot operated check valve 66 is provided in the first line 60 and is opened in response to pilot pressure in line 62. A pilot actuated two position hydraulic normally closed valve 68 is positioned in the first line 60 upstream of the assembly 42 for preventing the gripper 22 from opening until the push plate 20 has reached its extent of travel. The valve 68 is operated by the push/pull attachment 12 and opened when the push plate 20 has reached the end of its push stroke as will be more fully described hereinafter. In addition, conventional relief valves 70 and 72 are provided in the circuit and a check valve 74 in parallel with valve 68.

In operation, assuming that the push/pull attachment 12 and gripper assembly 22 are in the position, shown in FIG. 7A, and the operating valve 48 is operated to move push osition 54 into communication with the line 60 and 62. Hydraulic fluid will flow through line 60 and into the push side of piston and cylinder assembly 34 extending the push plate 20, and while the actuating fluid will flow through the check valve 66 it will not reach assembly 42 because valve 68 is closed, and check valve 72, which is in parallel with valve 68, is blocking flow. When the push/pull attachment 12 reaches the end of its stroke, it actuates the hydraulic switch 68 to the open position to allow fluid flow to move to the open side of the assembly 42 and raise the gripper bar 40.

Figure 4:
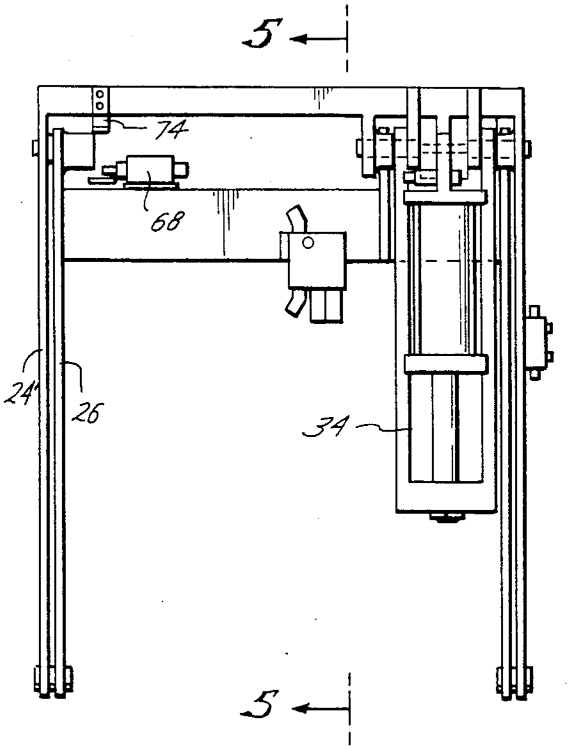
FIG. 4 is an enlarged elevational view of the push-/pull attachment having a pilot actuated valve connected to the attachment and operated by extension and retraction of the attachment.
Figure 5:
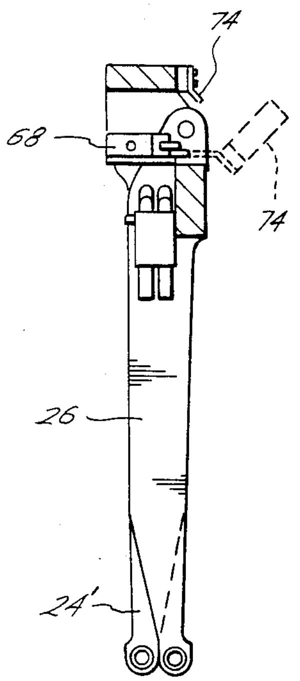
FIG. 5 is a cross-sectional view taken along the line 5—5 of FIG. 4, FIGS. 6A through 6H are elevational schematic views of the operation of a conventional slip sheet gripping mechanism.

As best seen in FIGS. 2, 4 and 5, the hydraulic valve 68 is mounted on one of the yokes, such as 26, and an actuating cam 74 is mounted on the other yoke, such as 24'. Thus, when the attachment 12 is in the extended position the cam engages and opens the hydraulic valve.

In order to move the operation from FIG. 7B to 7C, as best seen in FIG. 3, the operating valve 48 is actuated to move the pull position 58 into communication with the lines 60 and 62. In this position, fluid flows into line 62 and out of line 60, and first actuates assembly 42 to move the gripper bar 40 to the closed position. Fluid flows out of the close side of assembly 42, through check valve 74, and the now pilot operated open valve 66, and out line 60. After the assembly 42 is actuated to the closed position, the pressure in line 62 rises to a predetermined value to actuate the sequence valve 64 to the on position. Fluid from line 62 flows through valve 64 to the pull side of the push/pull assembly 34 to retract the push plate 20. This operation brings the sequence to that shown in FIG. 7D.

To deposit the load at a second location, as shown in FIGS. 7E and 7F, the operating valve 48 is again operated to place push position 54 in communication with the lines 60 and 62, which provides hydraulic fluid through line 60 and to the push side of the push/pull hydraulic assembly 34, which extends the push plate 20. The gripper 22 is operated in the open position when the push pull attachment 12 reaches the end of its stroke, and the cam 74 actuates the hydraulic switch 68 to the open position. The sequence of operation for FIG. 7G and 7H is accomplished by again operating the valve 48 to place it in the pull position.

Figure 7:
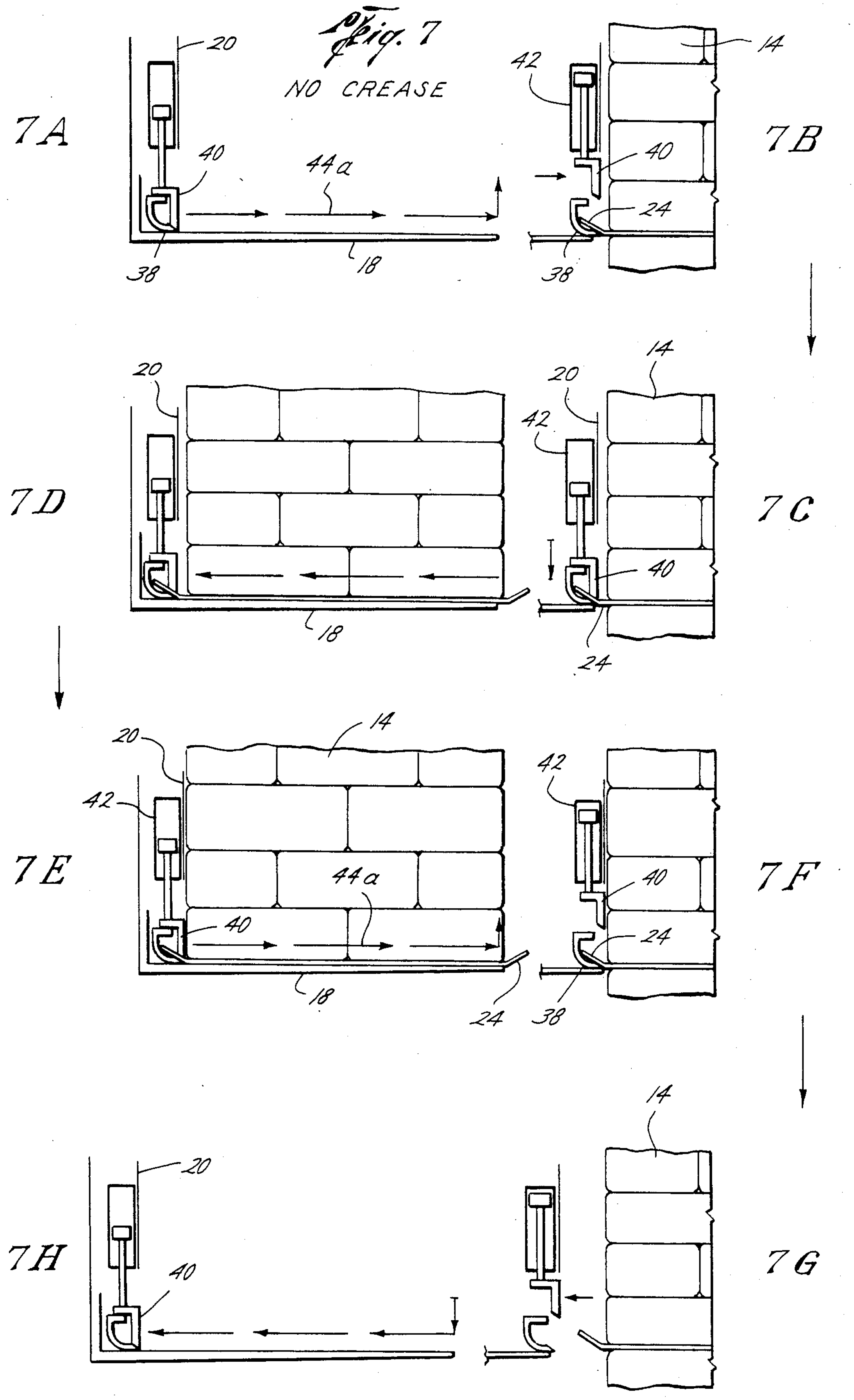
FIGS. 7A through 7H are schematic elevational views of the operation of the gripper mechanism using the no-crease option of the present invention.

Another embodiment is shown in FIGS. 8, 9 and 10, which allows the operator to electrically control from the truck 10, a suitable switch for operating in the conventional mode shown in FIG. 6, or in the no crease mode shown in Fig. 7. Corresponding parts to those shown in FIG. 3 are marked with corresponding numbers with the addition of the suffix "a". In this embodiment, the valve 80 is an electrically operated solenoid valve shown deactuated for operating in the conventional sequence, as shown in FIG. 6. That is, the electrical switch 82 positioned on the lift truck 10 is connected by an electrical line 84 through an electrical limit switch 86 to the solenoid actuated valve 80. In the position shown, the switch 82 is in the conventional or open position, whereby the solenoid is deenergized and the valve 80 is open to allow the system to be operated conventionally. In the event that it is desired to operate the circuit **46*a* in the no crease option, the switch 82 is closed which thereby energizes the solenoid operated valve 80 to place it in the closed position. Thereafter, the operation of a circuit 46*a* is identical to that described in connection with circuit 46 in FIG. 3. The only difference is that the cam operated limit switch 86 is used instead of the cam operated switch 68. Thus, as best seen in FIGS. 9 and 10, the limit switch 86 is mounted on one of the yokes, such as yoke 26, and the actuating cam 82 is mounted on 28 the second yoke 24'. Extension of the push/pull attachment 12 29 by piston and cylinder attachment 34 will rotate the yokes 24' and 26 relative to each other, and when they are in the fully extended position, will cause the cam 82 to contact and actuate the electrical limit switch 86, which in the no crease mode will move the valve 80** from the closed position to the open position.

The present invention, therefore, is well adapted to carry out the objects and obtain the ends and advantages mentioned as well as other inherent therein. While presently preferred embodiments of the invention have been given for the purpose of disclosure, numerous changes in the details of construction and arrangement of parts will be readily apparent to those skilled in the art, and which are emcompassed within the spirit of the invention and the scope of the appended claims.

What is claimed is:

1. A push/pull attachment for a lift truck having a no crease option comprising,
   - a push/pull attachment including platens, a push plate and a push/pull double acting piston and cylinder assembly for extending and retracting the push plate,
   - a gripper connected to the push plate including a close/open double acting gripper piston and cylinder assembly for closing and gripping or opening and releasing a slip sheet, movable over said platens and
   - a control circuit for maintaning closed the gripping position on the slip sheet in both directions of the push plate when the push plate is less than fully extended for protecting a load placed on said slip sheet from damage, said circuit including
     - a first hydraulic push line and second hydraulic pull line connected to the push/pull assembly for alternately acting on the assembly for extending or retracting the push plate,
     - an operating valve for supplying hydraulic fluid from a hydraulic source to said first and second lines,
     - said first line and second line connected to the gripper assembly for opening and closing said gripper, respectfully,
     - a pilot actuated two position hydraulic normally closed valve connected in the first line upstream of the gripper assembly,
     - said hydraulic valve connected to the push/pull attachment and actuated by said push/pull attachment when the push plate is fully extended thereby opening the two position valve for opening said gripper, and a check valve in parallel with the two position valve allowing fluid flow from the gripper assembly, but preventing fluid flow to the gripper assembly.

2. The apparatus of claim 1 wherein the push/pull attachment includes first and second pivotally connected members and said pilot valve is positioned on one of the members and a cam is positioned on the other 3. The apparatus of claim 1 wherein the pilot valve is solenoid operated.

4. The apparatus of 3 including, a hand controlled switch connected to the solenoid for deactuating the operation of the solenoid valve.

* * * * *

UNITED STATES PATENT OFFICE
CERTIFICATE OF CORRECTION

Patent No. 4,655,672 Dated April 7, 1987

Inventor(s) Stuart W. Sinclair et al.

It is certified that error appears in the above-identified patent and that said Letters Patent are hereby corrected as shown below:

Column 3, line 4, change "1986" to -- 1984 --

Column 5, line 16, delete "osition" and insert -- position --

Column 6, line 46, delete the comma after "sheet" and insert a comma after "platens"

Column 6, line 48, after "closed" insert -- the gripper to --

Column 8, line 2, after "other" insert -- member. --

Signed and Sealed this

Twenty-fifth Day of August, 1987

*Attest:*

DONALD J. QUIGG

*Attesting Officer* *Commissioner of Patents and Trademarks*